United States Patent [19]

Shotmeyer

[11] 3,910,298

[45] Oct. 7, 1975

[54] METHOD OF INSTALLING A WATER REMOVING AND/OR CONTENTS INDICATING DEVICE IN AN EXISTING UNDERGROUND LIQUID FUEL TANK

[76] Inventor: Albert Shotmeyer, 46 Westerly Road, Saddle River, N.J. 07458

[22] Filed: Oct. 16, 1974

[21] Appl. No.: 515,293

Related U.S. Application Data

[62] Division of Ser. No. 396,575, Sept. 12, 1973.

[52] U.S. Cl. .................. 137/1; 137/15; 137/315; 138/93; 138/94; 138/97
[51] Int. Cl.² .................................. F16L 55/12
[58] Field of Search ......... 137/1, 15, 315, 317, 318, 137/590; 138/89, 91, 93, 94, 97

[56] References Cited
UNITED STATES PATENTS

| | | |
|---|---|---|
| 2,899,983 | 8/1959 | Farris.................................... 138/94 |
| 3,298,398 | 1/1967 | Smith..................................... 138/94 |
| 3,533,424 | 10/1970 | Wedge................................. 137/318 |
| 3,799,182 | 3/1974 | Long...................................... 138/94 |
| 3,805,844 | 3/1974 | Bacon................................... 138/93 |
| 3,833,020 | 9/1974 | Smith..................................... 138/94 |

*Primary Examiner*—Martin P. Schwadron
*Assistant Examiner*—George L. Walton
*Attorney, Agent, or Firm*—Harry N. Schofer

[57] ABSTRACT

The device, which may be either a single or a double chambered container, is installed within an existing underground liquid fuel containing tank having an upstanding vent pipe by forming an opening in the side wall of the vent pipe, and inserting the container, in a deformed or crumpled state, through the opening. The container is attached to one or two flexible tubular conduits which are passed through the opening and serve as a means to remove water and/or to indicate the liquid contents within the tank.

7 Claims, 9 Drawing Figures

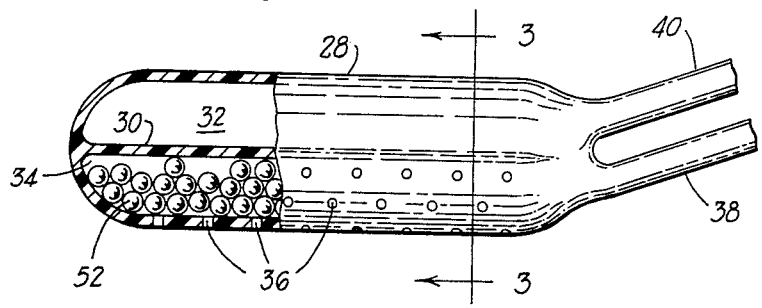
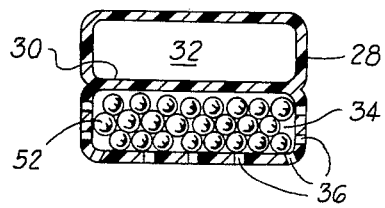
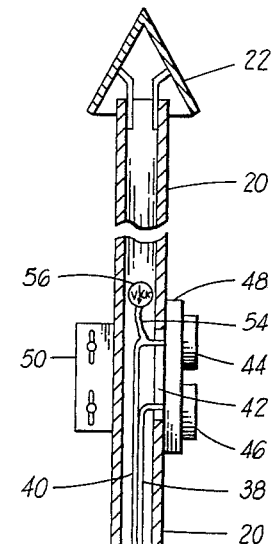
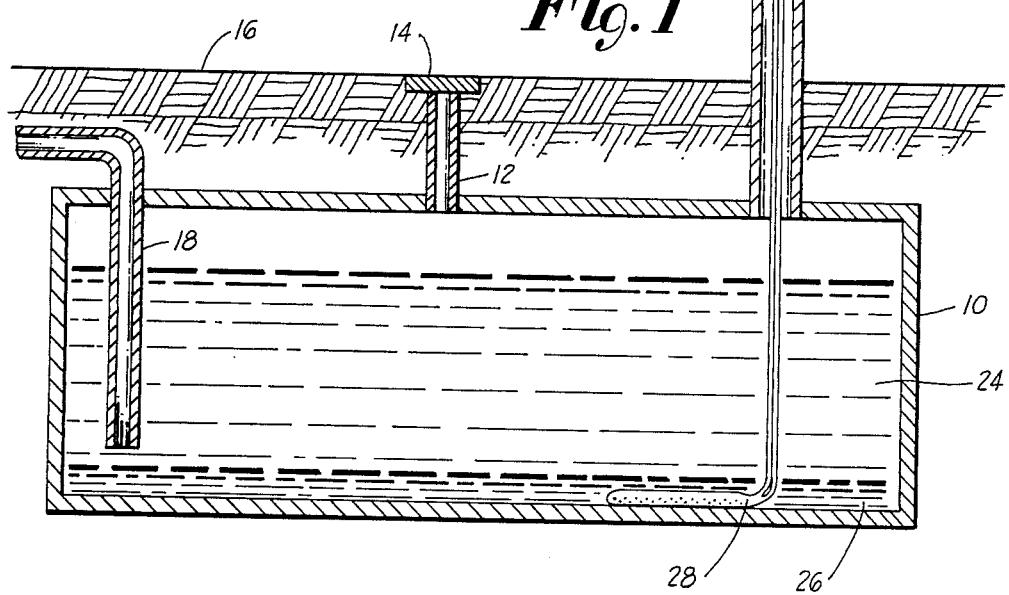

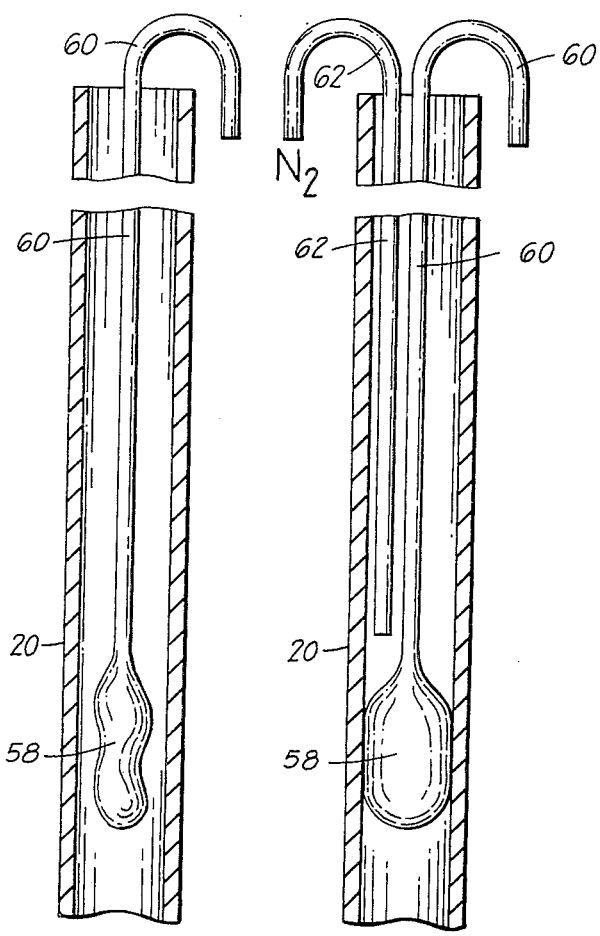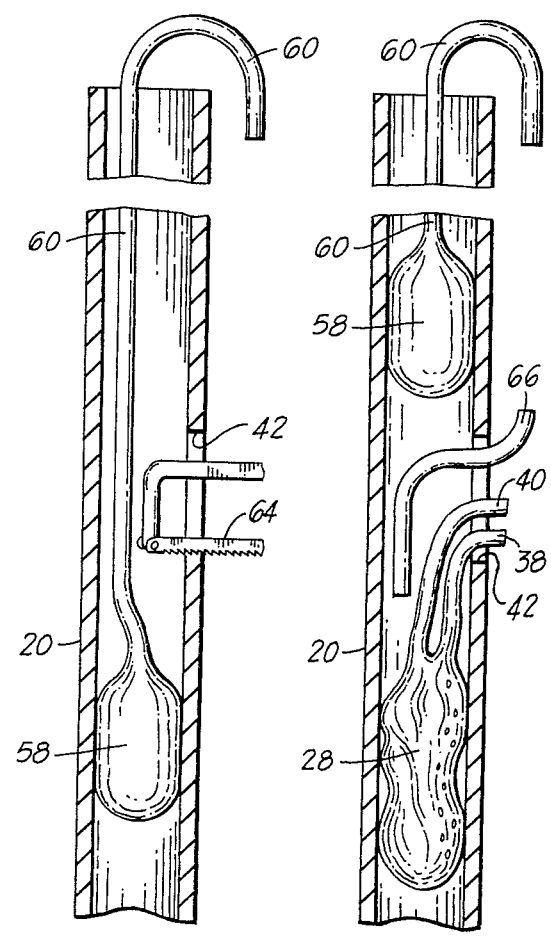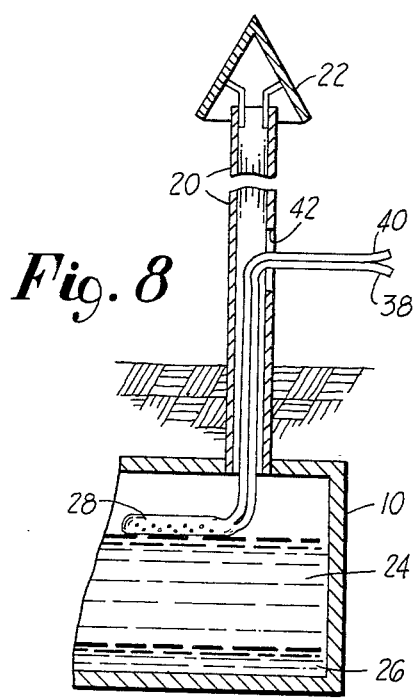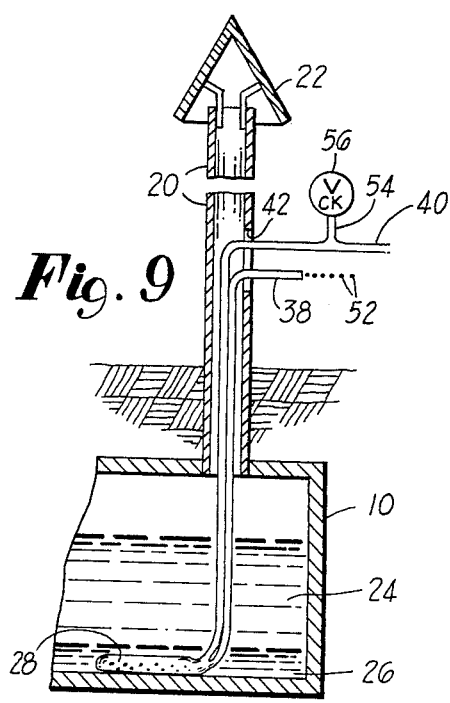

METHOD OF INSTALLING A WATER REMOVING AND/OR CONTENTS INDICATING DEVICE IN AN EXISTING UNDERGROUND LIQUID FUEL TANK

CROSS-REFERENCES TO RELATED APPLICATIONS

This application is a division of an application entitled Combined Water Removing and Contents Indicating Device For Underground Liquid Fuel Containing Tanks, Ser. No. 396,575, filed on Sept. 12, 1973, and the method disclosed and claimed herein can be used for installing the combined water removing and contents indicating device disclosed and claimed in said parent application. The method disclosed in this present application can also be used to install a device for removing water from the bottom of underground liquid fuel tanks disclosed and claimed in application Ser. No. 396,576, filed on Sept. 12, 1973, and to install a device to indicate the contents in an underground liquid fuel containing tank, disclosed and claimed in application Ser. No. 396,577, filed on Sept. 12, 1973.

BACKGROUND OF THE INVENTION

1. Field of the Invention

In application Ser. No. 396,576, mentioned above, there is disclosed a means for removing water that collects below the liquid fuel in underground fuel tanks. Several embodiments of the invention are disclosed, having in common a thin walled, easily deformable, container, made from a material that will not chemically react with the fuel or water within the tank. A flexible tubular conduit extends from the interior of the container through an opening in a side wall of the vent pipe to a point exteriorly thereof, to which a suction pump is attached to withdraw the water from the bottom of the tank.

In application Ser. No. 396,577, mentioned above, there is disclosed a device to enable a person to determine the contents in an underground liquid fuel tank. Two embodiments of the invention are disclosed, having in common the provision of a thin walled, easily deformable, container made from a material that will not chemically react with the water or liquid fuel within the tank. A transverse partition divides the interior of the tank into an upper chamber and a lower chamber, and a pair of flexible tubular conduits, one connected with each chamber, extend through an opening formed in a side wall of the vent pipe to a point exteriorly thereof. Particulate matter, or a heavy liquid, having a specific gravity greater than that of the liquid fuel and water within the tank, is passed through one conduit into the lower chamber of the container to serve as a ballast to sink and to maintain the container at the bottom of the tank, while a metered amount of a fluid is delivered through the other conduit to the upper chamber to serve as a hydrostatic fluid to indicate the liquid level within the tank, the other end of the latter conduit being connected with a pressure indicating means calibrated in gallons or liters.

The parent application, Ser. No. 395,575, combines the inventive concepts of the first two mentioned applications into a device to enable one to determine the contents within an underground liquid fuel tank and to permit the removal of water that collects below the liquid fuel. This application discloses a thin walled, easily deformable, container made from a material that will not chemically react with the fuel and water within the tank. A transverse partition divides the interior of the container into an upper chamber and a lower chamber. A pair of flexible tubular conduits, connected at one end with the upper chamber and lower chamber, respectively, extend through an opening in a side wall of the upstanding vent pipe to a point exteriorly thereof, one conduit being connected with a pressure indicating means calibrated in gallons or liters, and the other conduit being connected with a suction pump to enable one to withdraw water that has collected at the bottom of the fuel tank.

2. Description of the Prior Art

The accumulation of water within an underground liquid fuel tank presents a common problem, particularly in gasoline tanks. This water enters the tank from several different sources, and collects at the bottom, being heavier than the liquid fuel. In the case of existing underground tanks, no satisfactory means for removal of such water has been devised. The common practice involves the lowering of a tube through the fill pipe, and withdrawing the collected water. This is impractical for several reasons. The removal of the fill cap is undesirable, since it not only allows the entry of dust and dirt into the tank, but also allows the entry of moisture laden air, the moisture in the air condensing in the cool atmosphere within the tank. The dust and dirt may float on the top of the fuel, settle on the bottom, or remain suspended within the fuel where it will be withdrawn with the fuel. In the case of wet weather, rain water will enter through the fill pipe, or if pools of water surround the fill pipe, water will enter when the fill cap is removed.

It has also been suggested that water removing devices and/or contents indicating devices be added to existing underground liquid fuel tanks by cutting a hole in the top of the tank. This requires the removal of the paving and earth above the tank, and the cutting of a hole in the tank. The latter step is hazardous, especially in the case of metal tanks, where the creation of a spark during the cutting operation can easily result in an explosion.

The three inventions discussed above, disclosed in the three earlier filed applications, solve the problems by means of thin walled, easily deformable, containers, made from a plastic or rubber material, that can be installed within existing underground liquid fuel tanks without the necessity of excavating the earth and paving above the tank and without cutting a hole in the tank.

SUMMARY OF THE INVENTION

It is an object of this invention to provide a novel method of installing a water removing and/or a contents indicating device within an existing underground liquid fuel tank without cutting an opening in the tank or excavating the paving or earth above the buried tank.

It is a further object of the invention to provide a novel method of installing a water removing and/or a contents indicating device within an existing underground liquid fuel tank that does not interfere with the dispensing of fuel from or the addition of fuel into the tank during the installation operation.

It is a still further object of this invention to provide a novel method of installing a water removing and/or a contents indicating device within an existing underground liquid fuel tank that is safe, expeditious, economical, and which does not require the use of experienced personnel.

The attainment of the above objects, as well as additional objects and advantages, is accomplished by a series of steps in which the device is inserted through an opening formed in a side wall of the customary vent pipe connected with the underground fuel containing tank.

Fire regulations require the installation of a vent pipe connected with the interior of an underground liquid fuel tank through the upper wall thereof, the pipe extending to a point remote from the tank and terminating at an elevation above the surrounding buildings. This pipe is usually about 2 inches in internal diameter, the opening at the upper outer end being protected by a protective cap spaced slightly above the opening to prevent the entry of rain water, snow, or flying objects.

The present invention utilizes this vent pipe as a means of entry into the tank, and involves the steps of removing the protective cap, lowering a small deflated ballon having a tube connected therewith into the upper end of the vent pipe to a point below that point where one desires to cut an opening in the side wall. The ballon is inflated to form a block in the vent pipe to prevent the escape of fumes from the tank during the installation operation and to prevent sparks or fragments of hot metal from entering the tank. The interior of the pipe, above the inflated ballon or block, is purged by inserting a tube into the open upper end and delivering a blast of air or an inert gas, such as nitrogen. At a suitable point above the block, an opening is formed in the side wall by drilling, sawing, grinding, or by means of a blow torch. Having formed the opening, the balloon is deflated, moved to a point above the opening, and reinflated to form a new block.

The plastic container, having one or more tubular conduits attached thereto, is deformed or crumpled to fit within the pipe, and inserted through the opening. Depending upon the relative sizes of the deformed container and the pipe, it may be possible to force the container into the tank by pushing on the tubular conduit or conduits, or by the use of a flexible rod. However, in the case where there are one or more sharp bends in the vent pipe, it is not possible to push the container through the pipe, in which event the container can be forced into the tank by providing a blast of air or inert gas, or by means of a liquid jet, for example, fuel of the same type as that within the tank. The balloon is then deflated and removed.

Assuming that the container floats on the surface of the fuel within the tank when first installed therein, matter having a specific gravity greater than that of the fuel and water within the tank is passed into the interior of the container through one of the connecting tubular conduits. In a device having both water removing means and contents indicating means, disclosed in application Ser. No. 396,575, particulate matter such as shot is delivered to the lower chamber, the upper chamber being inflated to retain the shot-containing chamber on the lower side. A suction pump is connected with the conduit that is attached to the lower chamber, and a pressure responsive indicating means, calibrated in gallons or liters, is attached to the outer end of the conduit that is connected with the upper chamber.

If the device has for its purpose the withdrawal of the water from the bottom of the tank, disclosed in application Ser. No. 396,576, shot or other particulate matter is delivered through the single conduit type shown in FIGS. 2 and 3 of said application, or into the conduit attached to the lower chamber in the form of invention illustrated in FIGS. 4 and 5, and compressed air or other gas is delivered to the upper chamber through the tubular conduit attached thereto.

If the device is of the type disclosed in application Ser. No. 396,577 for the purpose of indicating the contents within the tank, a heavy liquid or particulate matter, having a specific gravity greater than that of the liquids within the tank, is passed into the lower chamber through the tubular conduit attached thereto, and a hydrostatic fluid is delivered into the upper chamber through its tubular conduit, the outer end of the latter tubular conduit being attached to a pressure responsive indicator calibrated to read in gallons or liters.

In any of the above described installations, the contents indicating means and the suction pump may be attached to a panel connected with the outer wall of the vent pipe, at eye level, in an obvious manner.

BRIEF DESCRIPTION OF THE DRAWINGS

For a clearer understanding of the invention, reference is made to the following detailed description and to the annexed drawings, in which:

FIG. 1 is a diagrammatic illustration of a typical installation of a combined water removing and contents indicating device within an underground liquid fuel tank capable of being installed following the steps of my invention;

FIG. 2 is an enlarged detailed view, partly in section, of the container portion of the device;

FIG. 3 is a sectional view of the container, taken on the line 3—3 of FIG. 2;

FIG. 4 is a sectional view through the upstanding vent pipe of the installation of FIG. 1 illustrating the step of lowering the blocking balloon;

FIG. 5 is a view similar to that of FIG. 4 illustrating the blocking balloon in its inflated condition and the step of purging the vapors from the vent pipe above the balloon;

FIG. 6 is a view similar to that of FIG. 4 illustrating the step of forming an opening in the side wall of the vent pipe;

FIG. 7 is a view similar to that of FIG. 4 illustrating the step of forcing the container through the vent pipe and into the underground liquid fuel tank;

FIG. 8 is a sectional view through the fuel tank and vent pipe illustrating the step of inflating the upper chamber of the container to cause the container to float on the surface of the liquid fuel; and FIG. 9 is a view similar to FIG. 8 illustrating the step of filling the lower chamber with particulate matter to cause the container to sink to the bottom of the tank.

DETAILED DESCRIPTION OF METHOD

Referring to the annexed drawings, and particularly to FIGS. 1, 2 and 3 illustrating a combined water removing device and a contents indicating device of the type disclosed and claimed in applicant's parent application Ser. No. 396,575 filed on Sept. 12, 1973, being typical of a type that can be installed within an existing underground liquid fuel tank employing the method forming the subject matter of the present invention, the numeral 10 designates an underground liquid fuel containing tank of the type used to store gasoline, having a fill pipe 12 extending from an opening in an upper wall of the tank to a point short of the surface of the earth or paving 16, and provided with a removable fill cap 14 having its upper surface flush with the surface of the surrounding earth or paving. A fuel dispensing pipe 18 extends through another opening in the upper wall of the tank, the lower end of the pipe being disposed a few inches above the bottom of the tank to prevent the entrainment of water, the pipe passing to a remotely positioned fuel pump, not shown.

An upstanding vent pipe 20 extends from still another opening in an upper wall of the tank 10 to a point above the surrounding buildings, being surmounted with a protective cap 22 spaced slightly above the upper end of the vent pipe, to permit the discharge of fuel vapors from the tank 10 into the surrounding atmosphere, and to prevent the entry of rain water or snow into the vent pipe and fuel tank.

The tank 10 is shown as containing a quantity of liquid petroleum fuel 24 overlying a small quantity of water 26. In installations of this type, it is impossible to prevent the accumulation of water within the tank. The water, having a specific gravity greater than that of the fuel, collects at the bottom, the two liquids being immiscible. This water enters the tank from various sources. It may be present in the fuel delivered into the tank, or may enter the tank when the fill cap 14 is removed for filling or for measuring the fuel contents by the act of inserting a calibrated rod, or may flow into the tank from the area surrounding the fill cap or, in rainy weather, the water may enter through the open fill cap or may be driven by wind through the vent pipe. Furthermore, as the liquid fuel is dispensed from the tank and the level of the fuel is lowered, moisture laden air may be drawn into the tank 10 through the vent pipe 20 to displace the withdrawn fuel, which moisture condenses in the cool atmosphere existing within the tank.

The lighter fuel 24 overlies the body of water 26, as shown in FIG. 1. The collection of small quantities of water is not objectionable, since the lower end of the dispensing pipe 18 is usually disposed a few inches above the bottom of the tank. However, as the quantity of water 26 accumulates, it reaches an objectionable level, whereby the agitation of the liquid fuel in the vicinity of the inlet to the dispensing pipe 18, during the withdrawal of the fuel, entrains some of the water and discharges it, along with the fuel being dispensed, into the fuel tanks of automobiles.

Various means have been suggested to remove this accumulated water. Most call for the installation within the tank of a suitable conduit having an open end at the bottom of the tank. This conduit must be inserted, in existing installations, through the fill pipe. This is not only time consuming, but requires the removal of the fill cap, thus permitting the entry of dust, dirt, and possibly additional water. Frequently the fill cap is located in a position where it is undesirable to remove because of the moving traffic. Other installations call for the formation of a hole in the top of the tank for the conduit to pass through. This can be done before the tank is buried, but is impractical for existing installations for obvious reasons, principally because of the hazard of creating a spark while forming a hole in the top of the tank.

The drawings illustrate a container 28, made from a flexible plastic material or rubber which does not chemically react with the fuel or water within the tank, this container being installed within an existing underground tank 10 without cutting or otherwise forming an additional hole or opening in the wall of the tank 10 as appearing hereinafter.

A transverse partition 30 divides the interior of the container 28 into an upper airtight chamber 32 and a lower perforated chamber 34, the latter chamber having a plurality of perforations 36 through a lower wall as seen in FIGS. 2 and 3. A first tubular conduit 40 is attached to one end of the upper chamber 32, and a second tubular conduit 38 is attached to one end of the lower chamber 34, the two tubular conduits extending upwardly through the tank 10 and the upstanding vent pipe 20, and through an opening 42 formed in a side wall of the latter pipe. This opening, as will be described fully hereinafter, is formed at a convenient level above the upper surface of the earth or paving 16.

The outer end of the first tubular conduit 40 is connected with a pressure gauge 44 calibrated in gallons or liters, thus forming a liquid fuel contents indicating means, and the outer end of the second tubular conduit 38 is connected with an exhaust pump means 46, which may be of the squeeze type in which a resilient walled member having inlet and outlet check valves may be alternately squeezed and released to perform a pumping action through the elongated conduit 38. Both the liquid fuel contents indicating means 44 and the exhaust pump means 46 are mounted on a panel 48 supported on a mounting bracket 50 attached to the vent pipe 20.

The interior of the lower perforated chamber 34 is filled, or partially filled, with particulate matter 52 that is insoluble in the fuel and water within the tank, such as shot or round pebbles delivered into the interior in a manner to be described later and forming the subject matter of this invention.

Adjacent the outer end of the tubular conduit 40 there is provided a branch duct 54 having an inwardly opening check valve 56 therein for a purpose to be described later in this specification.

The vent pipe 20 usually has about a two inch internal diameter, and it is proposed to form an opening 42 having a diameter of about 1½ inches, which should not materially weaken the vent pipe which is customarily supported by attachment to the wall of a building or to a pole.

Referring to FIG. 4, the protective cap is removed and a deflated balloon 58, having a duct 60 connected therewith, is lowered through the upper end of the vent pipe 20 to a position below that position where the opening is to be formed. It is preferred that the opening should be about eye level. The balloon is inflated by delivering compressed air or other gas through the duct 60, forming a block in the vent pipe to prevent the upward passage or vapors from the tank in an obvious manner, as illustrated in FIG. 5. A purging conduit 62 is lowered into the vent pipe from the upper end, and an inert gas, such as nitrogen, is passed through to purge the upper end of the vent pipe of any vapors therein.

Any suitable means may be used to form the opening 42 in the side wall, such as by drilling, sawing, grinding, or by a blow torch. FIG. 6 illustrates the use of a hack saw 64. In any of the operations mentioned, care must be taken to avoid cutting the duct 60 connected with the balloon 58, and if a blow torch is used, the duct should obviously be made from a material that will resist the torch heat. In any event, the balloon 58 should be made from a material that will resist the effects of the hot pieces of metal that will strike it during the cutting operation.

Referring to FIG. 7, when the opening 42 is formed, the balloon 58 is deflated, moved to a position above the opening, and reinflated, to form a block above the opening. The container 28, in a deflated and crumpled state, and devoid of particulate matter and gas, can easily be passed through the opening 42 and, by applying pressure to the tubular conduits 38 and 40, or by applying a blast of compressed gas through a flexible conduit 66 inserted through the opening above the container, forced into the tank 10. Instead of a blast of gas, a jet of liquid fuel, of the type stored within the tank 10, can be delivered through the conduit 66. The use of the conduit 66 may be necessary where there are bends in the vent pipe and/or there is a long vent pipe. Obviously, the tubular conduits 38 and 40 must be long enough to permit the outer ends thereof to extend through the opening 42 when the container 28 is in position within the tank.

FIG. 8 illustrates the container 28 within the tank 10. A small quantity of compressed air or inert gas is delivered through the tubular conduit 40 and into the upper airtight chamber 32 to assure that the container is upright, that is, with the chamber 32 in the topmost position. This will cause the container to float on the surface of the fuel 24 as shown.

Referring to FIG. 9, particulate matter 52, having a specific gravity greater than that of the fuel and water within the tank, such as shot or rounded pebbles, is then delivered through the outer end of the tubular conduit 38, which passes by gravity, or under the force of a jet of fluid, into the lower perforated chamber 34, causing the container to sink to the bottom of the tank, below the fuel 24 and water 26 therein, with the lower perforated chamber 34 in the lowermost position and with the perforations 36 adjacent the bottom of the tank 10 and immersed in the water therein. Obviously, the particulate matter must be smaller than the interior of the tubular conduit 38, and larger than the perforations 36.

Additional compressed air or inert gas is delivered through the check valve 56 and branch duct 54 until the reading on the gauge 44, which is calibrated in gallons or liters, corresponds to the known contents within the tank 10, which contents could be determined in any well known manner, such as by lowering a calibrated rod through the fill pipe 12.

The outer end of the tubular conduit 38 is connected with the suction pump means 46 mounted on the panel 48, and the panel is attached to the vent pipe 20 by the mounting bracket 50, thus covering the opening 42 to prevent the entry of dust and moisture.

I claim:

1. A method of installing a crumpable device for removing water from and/or for indicating the contents in an existing underground liquid fuel containing tank having an upstanding vent pipe connected with said tank, said device being structurally independent of said vent pipe and said tank, comprising the steps of: forming an opening in a side wall of said vent pipe above the surface of the ground and remote from said tank; and passing the device in its crumpled state into the tank through said opening and vent pipe into the tank.

2. A method of installing a crumpable device for removing water from and/or for indicating the contents in an existing underground liquid fuel containing tank as defined in claim 1, including the step of applying a blast of fluid through said opening and above said device whereby said device is carried by said blast of fluid through the vent pipe and into the tank.

3. A method of installing a crumpable device for removing water from and/or for indicating the contents in an existing underground liquid fuel containing tank as defined in claim 1, including the steps of providing a temporary block in the vent pipe between the point where the opening is to be formed and the tank prior to forming said opening, and purging the interior of the vent pipe above said block.

4. A method of installing a crumpable device for removing water from and/or for indicating the contents in an existing underground liquid fuel containing tank as defined in claim 1, in which the device has an air tight chamber and a connecting tubular conduit, including the step of inflating said chamber by delivering a gas under pressure through said tubular conduit after the device has been installed within the tank.

5. A method of installing a device for removing water from and/or for indicating the contents in an existing underground liquid fuel containing tank having an upstanding vent pipe, comprising the steps of: providing a temporary block in the vent pipe between the point where the opening is to be formed and the tank prior to forming said opening, purging the interior of the vent pipe above said block, forming an opening in a side wall of said vent pipe, moving the block from a position below the opening to a position above the opening, inserting said device into the vent pipe through said opening, and applying a blast of fluid through said opening and above said device to force the device into the tank.

6. A method of installing a device for removing water from and/or for indicating the contents in an existing underground liquid fuel containing tank having an upstanding vent pipe, in which the device has a perforated chamber and a connecting tubular conduit, comprising the steps of: forming an opening in a side wall of said vent pipe, inserting the device into the tank through said opening and vent pipe, and supplying particulate matter having a specific gravity greater than that of the liquid within the tank to said perforated chamber through said tubular conduit after the device has been installed within the tank to cause said device to sink to the bottom of said tank.

7. A method of installing a device for removing water from and/or for indicating the contents in an existing underground liquid fuel containing tank having an upstanding vent pipe, in which the device includes a container having an upper air tight chamber and a lower chamber and tubular conduits connecting with said chambers, comprising the steps of: forming an opening in a side wall of said vent pipe, inserting the device into the tank through said opening and vent pipe, supplying a gas under pressure to the upper chamber and supplying particulate matter, having a specific gravity greater than that of the liquid within the tank, to the lower chamber through the respective conduits after the device has been installed within the tank.

* * * * *